(12) United States Patent
Hughes

(10) Patent No.: US 9,874,271 B2
(45) Date of Patent: Jan. 23, 2018

(54) TRANSMISSION ARRANGEMENT

(71) Applicant: J. C. Bamford Excavators Limited, Rocester, Uttoxeter, Staffordshire (GB)

(72) Inventor: Steve Hughes, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 418 days.

(21) Appl. No.: 14/476,442

(22) Filed: Sep. 3, 2014

(65) Prior Publication Data
US 2015/0059522 A1 Mar. 5, 2015

(30) Foreign Application Priority Data

Sep. 4, 2013 (GB) .................................. 1315728.4

(51) Int. Cl.
*F16H 45/02* (2006.01)
*F16H 47/06* (2006.01)
*F16H 45/00* (2006.01)
*F16H 3/091* (2006.01)
*F16H 3/093* (2006.01)

(52) U.S. Cl.
CPC ............. *F16H 47/06* (2013.01); *F16H 45/00* (2013.01); *F16H 45/02* (2013.01); *F16H 3/091* (2013.01); *F16H 3/093* (2013.01); *F16H 2045/0221* (2013.01); *F16H 2045/0257* (2013.01); *Y10T 74/19009* (2015.01)

(58) Field of Classification Search
CPC .......... F16H 47/06; F16H 45/00; F16H 45/02; F16H 3/091; F16H 3/093
See application file for complete search history.

(56) References Cited

U.S. PATENT DOCUMENTS

| 4,820,209 A | 4/1989 | Newman |
| 5,190,128 A | 3/1993 | Iizuka |
| 5,819,587 A * | 10/1998 | Leber ...................... F16H 3/093 74/331 |
| 8,360,914 B2 * | 1/2013 | Ohashi .................. F16H 37/022 475/59 |
| 2003/0186768 A1 | 10/2003 | Evans et al. |

(Continued)

FOREIGN PATENT DOCUMENTS

| DE | 1138415 B | * 10/1962 |
| DE | 1138415 B | 10/1962 |

(Continued)

OTHER PUBLICATIONS

Search Report for GB 1315728.4, dated Apr. 8, 2014.

(Continued)

*Primary Examiner* — Gregory Prather
(74) *Attorney, Agent, or Firm* — Marshall, Gerstein & Borun LLP

(57) ABSTRACT

A transmission arrangement including a torque converter, a first shaft fixed to rotate with a turbine of the torque converter about an axis, a second shaft fixed to rotate with a casing of the torque converter about said axis, a gear mounted on the first shaft and being fixed to rotate with the first shaft and a clutch selectively engageable to cause the first shaft to be fixed to rotate with the second shaft and being selectively disengageable to allow the first shaft to rotate relative to the second shaft, the clutch being rotatable about said axis.

12 Claims, 2 Drawing Sheets

(56) References Cited

U.S. PATENT DOCUMENTS

2011/0312465 A1    12/2011   Ohashi et al.
2013/0306423 A1    11/2013   Ldeshio et al.

FOREIGN PATENT DOCUMENTS

| DE | 237699 A1 | * | 7/1986 |
| DE | 237699 A1 | | 7/1986 |
| DE | 19642228 A1 | * | 4/1998 |
| DE | 19642228 A1 | | 4/1998 |
| GB | 2180022 A | * | 3/1987 |
| GB | 2180022 A | | 3/1987 |

OTHER PUBLICATIONS

Search Report for EP 1418269.8, dated Dec. 5, 2014.
Office Action Issued in Chinese Patent Application No. 201410447634.1, dated Jun. 1, 2017.

* cited by examiner

TRANSMISSION ARRANGEMENT

FIELD OF THE INVENTION

The present invention relates to a transmission arrangement, in particular a transmission arrangement including a torque converter. The present invention also relates to a power arrangement, in particular a power arrangement including a prime mover and a transmission arrangement.

BACKGROUND OF THE INVENTION

Transmission systems are known whereby a prime mover, such as an internal combustion engine, drives a torque converter which in turn drives a gearbox having multiple ratios. When such a transmission is used on a vehicle, the gearbox will typically have a plurality of forward gears and one or more reverse gears. The advantage of the torque converter is that the torque being transmitted from the prime mover is multiplied. The disadvantage is that the torque converter itself absorbs energy, which energy cannot therefore be used to propel the vehicle.

In order to overcome this problem torque converters can be fitted with lock-up clutches. US2003/0186768 shows an example of torque converter with a lock-up clutch. The torque converter has a casing to which is attached an impeller. Rotatable relative to the casing is a turbine. A friction clutch operably acts between the turbine and an inside part of the casing to prevent rotation of the turbine relative to the casing under certain circumstances.

Typically the lock-up clutch is used in the high gears, for example top gear, when shock loads from the wheels of the vehicle to the torque converter are less significant. When the vehicle is used in a low gear, for example bottom gear, then the shock loads coming from the wheels are correspondingly higher and accordingly the torque capacity of the lock-up clutch may not be sufficient to withstand these loads. Thus, whilst a lock-up clutch reduces wasted energy in the high gears, it may not be able to reduce wasted energy in the low gears. Further, providing a lock-up clutch within a torque converter casing is expensive. In particular the valves used to engage and disengage the lock-up clutch are expensive.

Whilst it is possible to provide multiplate lock-up clutches in a torque converter casing, so as to allow the torque converter to lock-up in all gears, such multiplate lock-up clutches are considerably more expensive than the single plate lock-up clutch shown in US2003/0186768.

SUMMARY OF THE INVENTION

An object of the present invention is to provide an improved transmission including a torque converter.

Thus, according to the present invention there is provided a transmission arrangement including a torque converter, a first shaft fixed to rotate with a turbine of the torque converter about an axis, a second shaft fixed to rotate with a casing of the torque converter about said axis, a gear mounted on the first shaft and being fixed to rotate with the first shaft and a clutch selectively engageable to cause the first shaft to be fixed to rotate with the second shaft and being selectively disengageable to allow the first shaft to rotate relative to the second shaft, the clutch being rotatable about said axis.

The gear may be positioned axially between the torque converter and the clutch.

The transmission arrangement may include a third shaft fixed to rotate with the second shaft about a said axis wherein the clutch is supported by the third shaft.

The second shaft may include a spline in engagement with a further spline of the third shaft so as to fix the third shaft to rotate with the second shaft and the clutch may be positioned axially between the torque converter and one or both of the spline and further spline.

The second shaft may have a first end proximate the torque converter and a second end remote from the torque converter, the first and second ends may define a second shaft length and the gear may be positioned axially closer to the first end than the second end.

An axial distance from the first end of the second shaft to the gear may be less than 40% of the second shaft length.

The torque converter may define a plane which is positioned axially between the first end and the second end.

The gear may engage a further gear mounted on a fourth shaft rotatable about a second axis, the gear and further gear defining a gear plane, the fourth shaft including one or more additional gears, each defining an additional gear plane wherein the gear plane is positioned between the or each additional gear plane and a plane defined by the torque converter.

The fourth shaft may include one or more additional clutches, each defining an additional clutch plane wherein the gear plane is positioned between the or each additional clutch plane and the plane defined by the torque converter.

The transmission arrangement may include a multispeed gearbox driven by a said gear.

The said gear may be the only gear which transmits power from the torque converter to the multispeed gearbox.

The second shaft may be in permanent driving connection with an oil pump input drive.

The oil pump input drive may be engaged with the third shaft.

The power arrangement may include a prime mover having an output shaft and a transmission arrangement wherein the output shaft is fixed to rotate with the casing.

The prime mover may be an internal combustion engine, in particular an internal combustion engine having reciprocating pistons, for example a compression ignition engine such as a diesel engine.

The gear may be positioned on an opposite side of the torque converter to the prime mover. The clutch may be positioned on an opposite side of the torque converter to the prime mover.

The clutch may be positioned externally relative to the casing.

The output shaft may be fixed to rotate with and engage and drive a flywheel which is fixed to rotate with and engage and drive a flex plate which is fixed to rotate with and engage and drive the casing.

The transmission arrangement may be incorporated into a working machine. The transmission arrangement may drive the ground engaging structure of the working machine. The ground engaging structure may be tracks or may be wheels. When the ground engaging structure is a set of front wheels and a set of rear wheels then the front or rear wheels may be selectively driven by the transmission arrangement either independently or together.

BRIEF DESCRIPTION OF THE DRAWINGS

The invention will now be described, by way of example only, with reference to the accompanying drawings in which.

DETAILED DESCRIPTION

Figure 2:
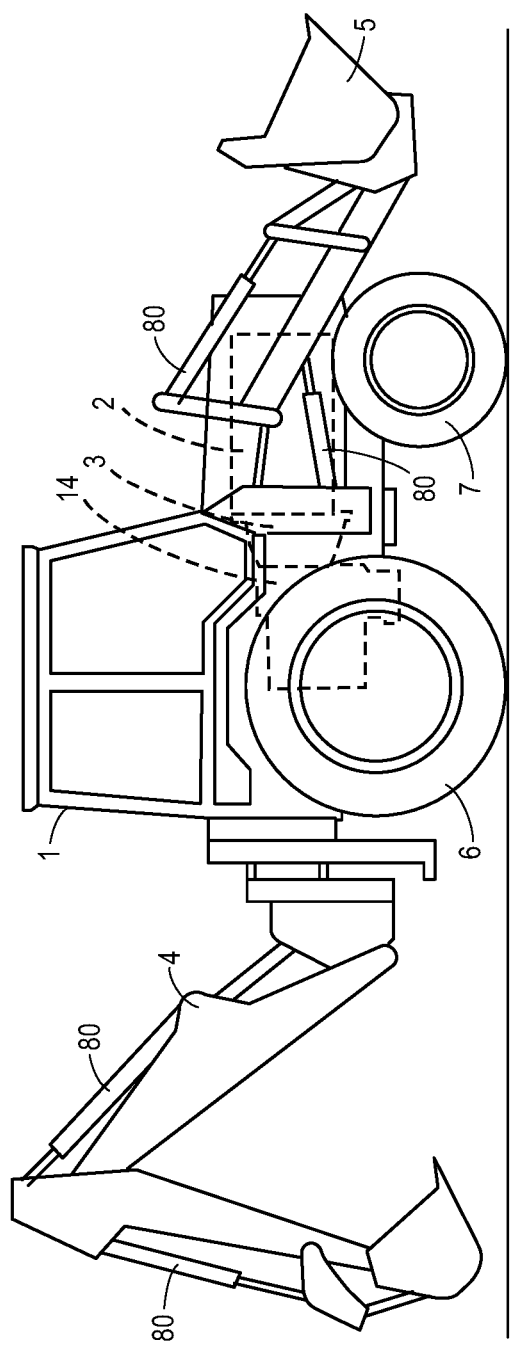
FIG. 2 is a view of a machine including the transmission arrangement of FIG. 1.

With reference to FIG. 2 there is shown a working machine (or material handling machine) 1 including a prime mover 2 in the form of a diesel engine, a bell housing 3 and a gear box 14. In this case, the working machine 1 is a back hoe loader, having a back hoe 4 and a loading shovel 5. The working machine has ground engaging means in the form of rear wheels 6 and front wheels 7. The diesel engine 2 can drive the rear wheels 6 via the gear box, thereby propelling the vehicle. The gear box has a plurality of forward gears and a plurality of reverse gears. An output 15 from the gearbox is drivingly coupled to the rear wheels, for example via a crown wheel and pinion and differential assembly and shafts.

The gear box may selectively be able to drive the front wheels 7 (as will be described below).

Positioned between the engine and the gear box and within bell housing 3 is a torque converter 12.

Figure 1:
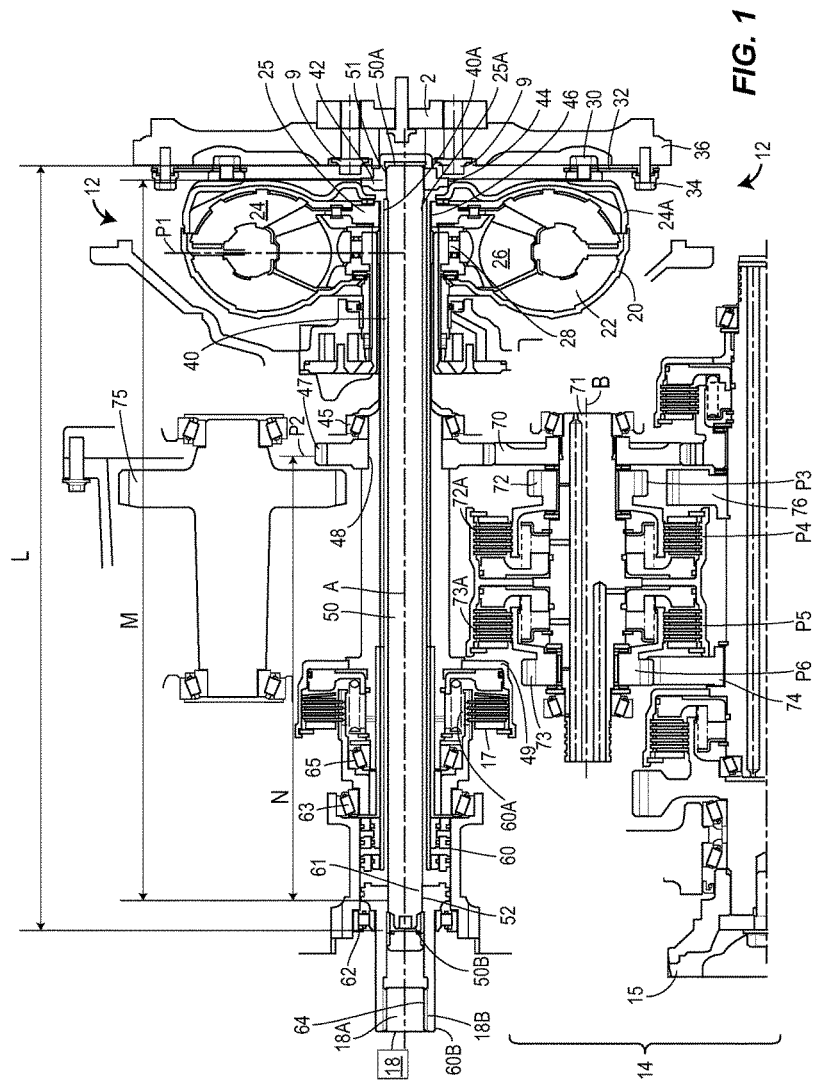
FIG. 1 is an enlarged view of part of a transmission arrangement according to the present invention.

FIG. 1 shows a transmission arrangement 10 including the torque converter 12 and the gear box 14.

The torque converter is a non lock-up torque converter, that is to say a torque converter without an internal lock-up clutch.

As best seen in FIG. 1, the torque converter 12 includes a casing (also known as shell) 20 within which is positioned an impeller 22 and a turbine 24. Also mounted within the casing is a reaction element 26 which is held against rotation under torque conversion conditions by a conventional over running device 28, such as a sprag type one way clutch. Bolts 30 secure the turbine side 24A of the casing 20 to a flex plate 32. Further bolts 34 secure the flex plate 32 to a fly wheel 36 of the prime mover 2.

The turbine 24 is connected to a first shaft 40 via a turbine mounting ring 25.

Transmission of power from the prime mover 2 to the turbine 24 is conventional and need not be described in detail, however, in summary rotation of the flywheel 36 of the prime mover 2 causes the flex plate 32 to rotate the casing 20. As the casing rotates then the vanes of the impeller 22 rotate and fluid within the torque converter causes the blades of the turbine 24 to rotate, though at a slower speed than the speed of rotation of the prime mover 2.

The casing 20 includes a boss 42 secured rotationally fast therewith via weld 44. Boss 42 has a central splined recess 43. A second shaft 50 has an end 50b with splines 51 that engages with the splined recess 43 thereby ensuring that shaft 50 is rotationally fast with boss 42, and in particular is rotationally fast with flywheel 36 of the prime mover (via the turbine side 24A of the casing and the flex plate 32).

Turning to FIG. 1, the first shaft 40 is rotatably supported in bearings 65. End 40A of first shaft 40 has an external spline 46 which is engaged with an internal spline 25A of the turbine mounting ring 25. A gear 47 is mounted on the first shaft 40 via a spline arrangement 48.

As will be appreciated, the gear 47 is fixed to rotate with the first shaft 40, which in turn is fixed to rotate with the turbine 24.

The first shaft also includes a clutch housing portion 49 which supports the clutch 17.

The second shaft 50 includes a first end 50A and a second end 50B. As mentioned above, the first end 50A includes a spline 51. Proximate the second end 50B the second shaft 50 includes an external spline 52.

External spline 52 engages an internal spline 61 of a third shaft 60. Third shaft 60 is supported on bearings 62 and 63. Third shaft 60 has a first end 60A upon which is mounted a clutch 17. The third shaft also has a second end 60B which includes an internal spline 64. An oil pump 18 (shown schematically in FIG. 1) includes an oil pump drive 18A which has an external spline 18B. Spline 18B is engaged with spline 64 of the third shaft.

As will be appreciated, the third shaft is fixed to rotate with the second shaft. The second shaft is fixed to rotate with the torque converter casing 20. The torque converter casing 20 is fixed to rotate with the flywheel. The flywheel is fixed to rotate with the output shaft (crankshaft) 8 of the prime mover 2 by virtue of the flywheel being bolted to the crankshaft via bolts 9.

Bearing 65 supports the third shaft relative to the second shaft.

In summary, the turbine 24, first shaft 40 and gear 47 are all rotationally fast with each other. The crank shaft 8, flywheel 36, torque converter casing 20, second shaft 50 and third shaft 60 and oil pump drive 18A are all rotationally fast with each other. First shaft 40, second shaft 50, third shaft 60 and clutch 17 all rotate about axis A. Crank shaft 8 and torque converter 12 also rotate about axis A.

Gear 47 engages a further gear 70 which is mounted on a fourth shaft 71 which rotates about axis B. Mounted to the left (when viewing FIG. 1) of the further gear 70 is gear 72 and gear 73, clutch 72A and clutch 73A. The torque converter 12 defines a plane P1. The gear 47 defines a plane P2. Gear 72 defines a plane P3. Clutch 72A defines a plane P4. Clutch 73A defines plane P5. Gear 73 defines a plane P6.

Gear 47 defines the sole input into the gearbox 14. Power from the prime mover can be transmitted to gear 47 in one of two ways:

a) with clutch 17 disengaged power is transmitted from the crank shaft 8 through the flywheel 36 through the flexplate 32 through the casing 20 through the impeller 22 through the turbine 24 through the turbine mounting ring 25 through splines 25A, through splines 40A, through the right hand part (when viewing FIG. 1) of the first shaft 40 through the spline arrangement 48 to the gear 47. Under these circumstances, because the power is being transmitted via the torque converter, the first shaft 40 will be rotating slightly slower than the crank shaft 8. Accordingly, because the third shaft will be rotating at crank shaft speed, then the first end 60A of the third shaft will be rotating at a different speed to clutch housing portion 49, and this is possible since clutch 17 is disengaged.

b) with clutch 17 engaged, then power from the crankshaft is transmitted through the flywheel 36, through the flexplate 32, through the casing 20, through the boss 42, through the spline recess 43, through spline 51, through the second shaft 50, through the spline 52, through the spline 61, through the third shaft 60, through engaged clutch 17, through clutch housing portion 49, through the left-hand part (when viewing FIG. 1) of the first shaft 40, through the spline arrangement 48 to gear 47.

Under these circumstances, the first and second shafts will both be rotating at the same speed and accordingly the impeller and turbine will also be rotating at the same speed. Because the impeller and turbine will be rotating at the same speed, then the torque converter will not be able to transmit any power (since the torque converter relies on a mismatch of rotational speeds of the impeller and turbine to transmit power and no such mismatch exists).

Thus, gear 47 is either directly driven (when clutch 17 is engaged) or is torque converter driven (when clutch 17 is disengaged). Under either circumstance, gear 47 transmits power to gear 70 which is rotationally fast with shaft 71. When forwards motion of the working machine 1 is required, clutch 72A is disengaged, and clutch 73A is engaged. This results in gear 73 becoming rotationally fast with shaft 71 and thereby transmitting power from gear 70, through shaft 71, through clutch 73A, through gear 73 and through gear 74 and on through the rest of the forward gears within the gear box, depending upon which forward gear ratio is selected.

When it is required to reverse the working machine 1, then clutch 73A is disengaged and clutch 72A is engaged. This results in gear 47 turning gear 70 which in turn turns shaft 71 which turns clutch 72A which turns gear 72 (which is now rotationally fast with shaft 71), which turns reverse idler 75 (shown in a developed position in FIG. 1 for ease of understanding), which in turn is engaged with and turns gear 76, which turns the rest of the gearbox in whichever reverse gear is selected.

As will be appreciated, gear 47 is positioned axially between the torque converter 12 and the clutch 17. The clutch 17 is positioned axially between the torque converter and splines 52 and associated splines 61.

Thus, consideration of the transmission path with direct drive (i.e. with clutch 17 engaged) shows that power is transmitted from spline 51, along almost the entire length of the second shaft to spline 52, i.e. power is transmitted over length M of the second shaft. However, in direct drive the power now has to be transferred from spline 52 to gear 47 via the third shaft, clutch 17 and left hand most portion of the first shaft, in other words the power has to be transmitted over length N. Thus, the effective length over which power has to be transmitted along shafts from spline 51 to gear 47 is equal to M+N. Making the effective length of the shafts over which power has to be transmitted (M+N) relatively large gives certain advantages when power is being transmitted in direct drive mode (i.e. with clutch 17 engaged). A relatively large effective shaft length (M+N) creates a greater torsional flexibility than if the effective length of the shaft were shorter. This torsional flexibility is advantageous when the prime mover is an internal combustion engine. Thus, it is known for internal combustion engines, in particular piston type (or reciprocating type) internal combustion engines have torque fluctuations as the fuel in each cylinder is sequentially ignited. On non-torque converter vehicles, it is known to provide a torsional damper (such as circumferentially orientated springs) in a clutch so as to prevent, or reduce the torque fluctuations from the engine being transmitted to the gearbox. If such torque variations are transmitted to the gearbox then this can result in a noisy gearbox.

When power is transmitted through the torque converter of the present invention, then engine torque variations are naturally damped out by the torque converter itself.

One advantage of the present invention is that for certain embodiments it is not necessary to have any separate torsional damper arrangement because the effective length of the shaft (M+N) is arranged to be relatively long and those parts of the shafts (the second shaft, the third shaft, and the left-hand portion of the first shaft) can be arranged to have a torsional national frequency which is lower than an idling speed of the engine. As such, not only does the relatively long effective length (M+N) result in less torsional vibration being transmitted to the gearbox 14 at speeds at or above engine idle, it is also possible for the overall natural frequency of the first, second and third shafts to be lower than an idle speed of the engine and therefore the effective shaft length (N+M) will never continuously run at a natural frequency, and will only momentarily pass through a natural frequency upon engine start up or engine stop.

Consideration of FIG. 1 shows that the transmission arrangement has been designed to increase the effective length (M+N) of the shaft. Thus, the gear 47 is positioned axially between the torque converter and the clutch. The clutch 17 is positioned axially between the torque converter and the spline coupling between the second and third shaft (splines 52 and 61). The gear 47 is positioned closer to first end 50A than it is to second end 50B of the second shaft. In particular the actual distance from the first end 50A to the gear 47 is less than 40% of the length L of the second shaft. The plane P1 defined by the torque converter is positioned axially between the first and second ends of the second shaft. The plane P2 defined by gear 47 is positioned nearer to plane P1 of the torque converter than planes P3, P4, P5 and P6. Thus, by positioning gear 47 to the right of gear 72 and 74 and clutches 72A and 73A requires the left-hand portion of the first shaft between gear 47 and clutch housing portion 49 to be lengthened to span this distance thereby increasing the effective length (M+N) of the shaft.

As mentioned above, shaft 3 also drives an oil pump which, in some embodiments, has a damping effect. Thus, any torque fluctuations which may be transmitted from the engine along the second shaft may then be damped by the second shaft as it powers the oil pump. As such the torque fluctuations will be reduced and therefore fewer torque fluctuation will be transmitted onward through third shaft and clutch 17 and the left-hand portion of the first shaft to the gearbox thereby resulting in a quieter gearbox. The oil pump may be used to operate hydraulic rams 80 or other hydraulic surfaces of the working machine.

For the avoidance of doubt, a component is fixed to rotate with another component when that component cannot rotate relative to the other component. In other words, when rotating, the component and the other component both rotate at the same speed. The phrase "rotationally fast with" means the same as "fixed to rotate with".

The clutches shown in the figures are multi plate clutches, though in further embodiments this may not be the case.

The invention claimed is:

1. A transmission arrangement including a torque converter, a first shaft fixed to rotate with a turbine of the torque converter about an axis, a second shaft fixed to rotate with a casing of the torque converter about said axis, a gear mounted on the first shaft and being fixed to rotate with the first shaft and a clutch selectively engageable to cause the first shaft to be fixed to rotate with the second shaft and being selectively disengageable to allow the first shaft to rotate relative to the second shaft, the clutch being rotatable about said axis, the gear being positioned axially between the torque converter and the clutch, the second shaft having a first end proximate the torque converter and a second end remote from the torque converter, the first and second ends defining a second shaft length and the gear being positioned axially closer to the first end than the second end, the first end including a spline and the second shaft including an external spline proximate the second end, the spline of the first end and the external spline defining a first length over which power is transmitted when the clutch is engaged, the gear being positioned axially closer to the spline at the first end of the second shaft than it is to the external spline proximate the second end of the second shaft, and the transmission arrangement further including a third shaft fixed to rotate with the second shaft about said axis, wherein the clutch is supported by the third shaft, wherein when the clutch is engaged, power is transferred over a second length, defined between the external spline and the gear, via the third shaft, the clutch, and a portion of the first shaft, thereby defining an effective length over which power is transmitted from the spline of the first end to the gear.

2. A transmission arrangement as defined in claim 1 wherein the external spline is in engagement with a further spline of the third shaft so as to fix the third shaft to rotate with the second shaft and the clutch is positioned axially between the torque converter and one or both of the external spline and the further spline.

3. A transmission arrangement as defined in claim 1 wherein an axial distance from the first end of the second shaft to the gear is less than 40% of the second shaft length.

4. A transmission arrangement as defined in claim 1 wherein the torque converter defines a plane which is positioned axially between the first end and the second end.

5. A transmission arrangement as defined in claim 4 wherein the gear engages a further gear mounted on a fourth shaft rotatable about a second axis, the gear and the further gear defining a gear plane, the fourth shaft including one or more additional gears, each defining an additional gear plane wherein the gear plane is positioned between the or each additional gear plane and the plane defined by the torque converter.

6. A transmission arrangement as defined in claim 5 wherein the fourth shaft includes one or more additional clutches, each defining an additional clutch plane wherein the gear plane is positioned between the or each additional clutch plane and the plane defined by the torque converter.

7. A transmission arrangement as defined in claim 1 wherein the transmission arrangement includes a multispeed gearbox driven by said gear.

8. A transmission arrangement as defined in claim 7 wherein said gear is the only gear which transmits power from the torque converter to the multispeed gearbox.

9. A transmission arrangement as defined in claim 1 wherein the second shaft is in permanent driving connection with an oil pump input drive.

10. A transmission arrangement as defined in claim 9 wherein the oil pump input drive is engaged with the third shaft.

11. A power arrangement including a prime mover having an output shaft and a transmission arrangement as defined in any preceding claim wherein the output shaft is fixed to rotate with the casing.

12. A power arrangement as defined in claim 11 wherein the output shaft is fixed to rotate with and engages and drives a flywheel which is fixed to rotate with and engages and drives a flex plate which is fixed to rotate with and engages and drives the casing.

* * * * *